2,949,378
ASPHALT COMPOSITIONS

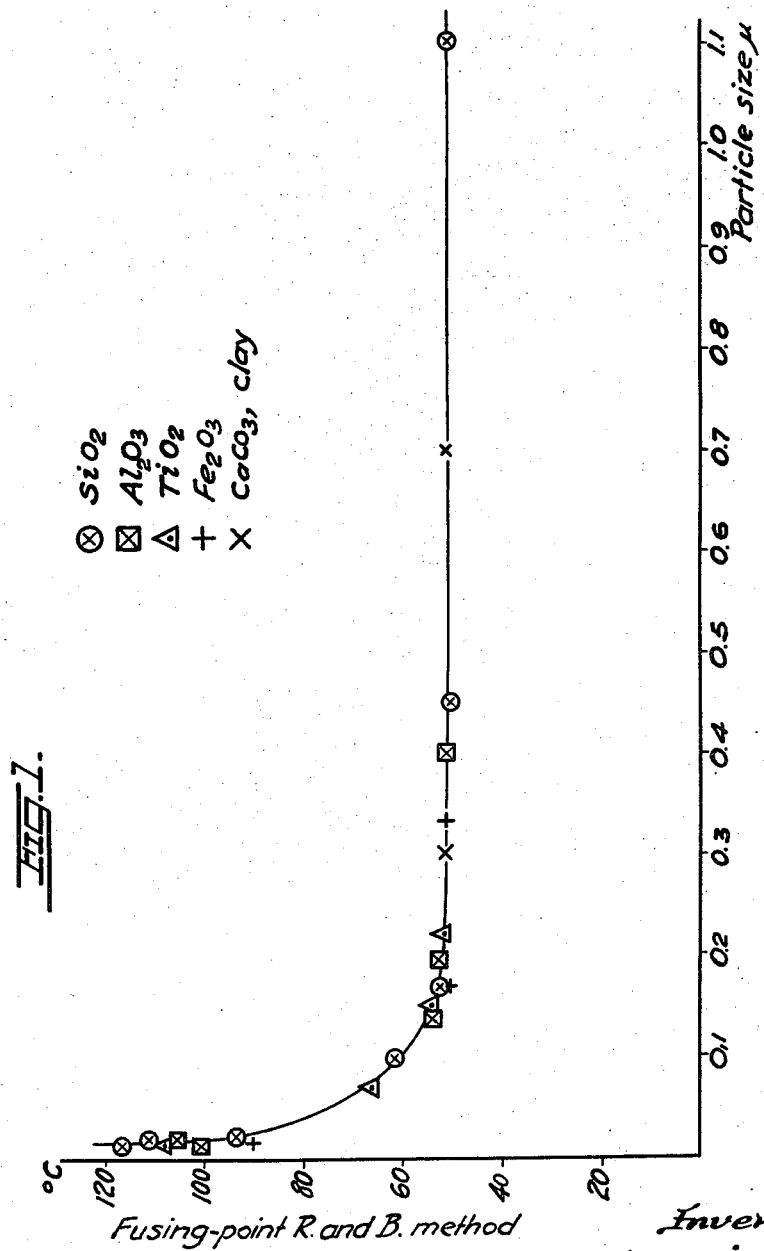

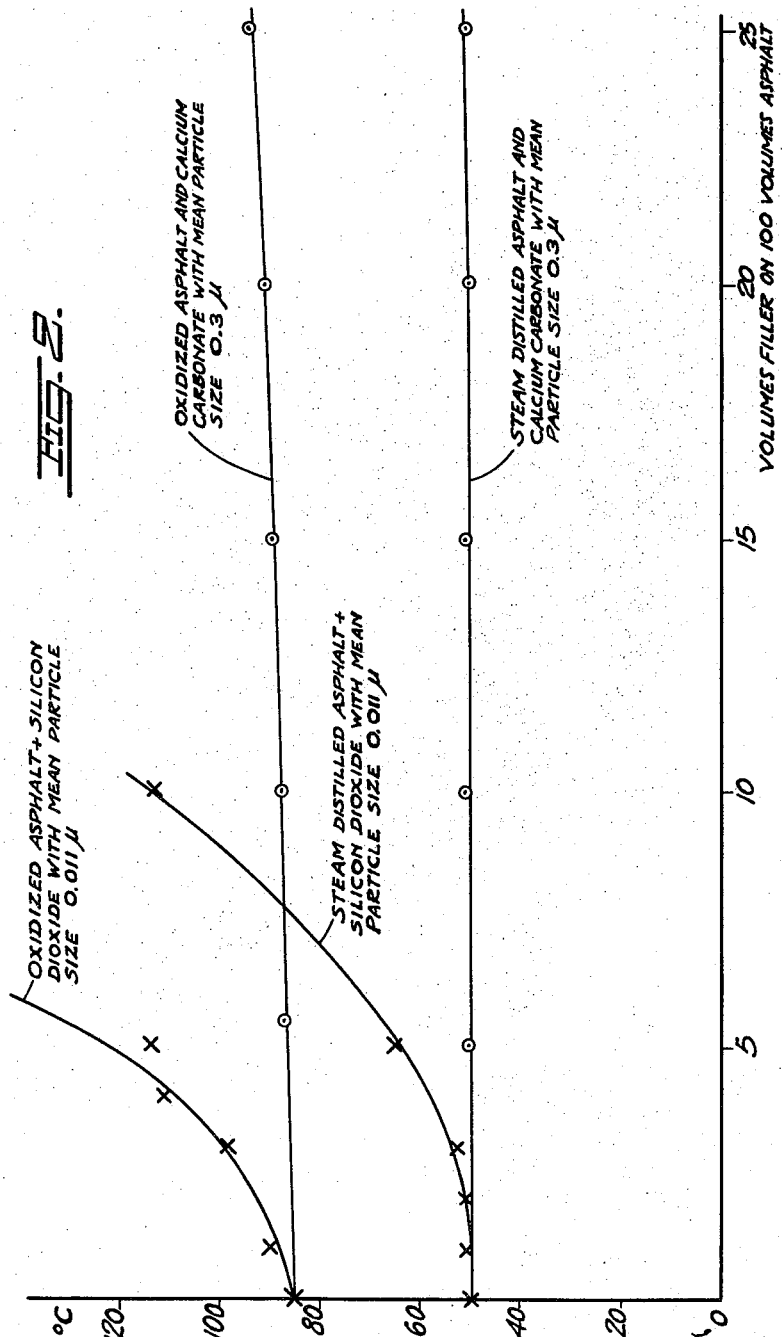

Per Henning Wilhelm Ågren and Gösta Lennart Flemmert, Nynäshamn, Sweden, assignors to AB Nynas-Petroleum, Nynäshamn, Sweden, a corporation of Sweden Filed Dec. 6, 1954, Ser. No. 473,356

Claims priority, application Sweden Dec. 8, 1953

6 Claims. (Cl. 106—281)

This invention relates to a process for improving the properties of asphalt and similar bituminous products. More particularly, the object of the invention is to provide an improved asphalt with considerably increased hardness, elasticity and capacity to withstand mechanical wear while at the same time the dependence of the viscosity on the temperature and the permeability to water vapour and water are appreciably reduced.

In order to increase the hardness and also the capacity to resist mechanical wear to some extent, asphalt is usually mixed with fillers, such as finely ground stone, calcium carbonate, infusorial earth, asbestos or the like. Even after the admixture of considerable quantities of the above-mentioned fillers in the hitherto customary manner, however, the effect is relatively insignificant. For example, with the admixture of 20% by volume of the fillers referred to, the fusing point is only raised by 2–7° C., while the elasticity and permeability are not appreciably improved. Moreover, mixtures containing the above fillers possess the great disadvantage that the fillers are liable to deposit as sediment, especially at high temperature or when the asphalt is diluted with solvents of high fluidity.

The above-mentioned disadvantages are eliminated by the present invention. According to the invention this result is obtained by adding to the asphalt or similar bituminous products to be treated a filler consisting of an inorganic substance insoluble in the bituminous material in question and having a mean particle size of less than $0.1\mu$, the quantity of said filler being from about 1% by volume to about 25% by volume, based on the volume of the bituminous material, and thoroughly mixing the filler with the bituminous material.

The invention is based on the discovery that the slight activity or efficiency of the fillers or added substances employed hitherto is due to their relatively large grain size—the mean particle size of these additional substances has usually been within the ranges $0.5$–$100\mu$. These fillers have therefore served mainly as supplementary media for rendering the asphalt cheaper but have not improved its properties appreciably.

Contrary to the foregoing, the fillers according to the invention are active to very high degree. Even relatively low contents of the same have a considerable effect on the asphalt in a favorable direction. Thus, for example, an admixture of 1–10% by volume of these substances is accompanied by as high an increase in the fusing point as 5–100° C. while at the same time the breaking point remains substantially unchanged. Consequently, the temperature interval between the breaking point and the fusing point is considerably increased. In addition, obvious elastic properties are imparted to the mixture. Thus, for example, from common steam distilled asphalt a product similar to common oxidized asphalt is obtained by addition of the filler according to the invention. Moreover, the capacity to withstand mechanical wear is considerably increased, the tendency to "bleeding" is much reduced and the permeability to water and water vapour is decreased.

Suitable active fillers according to the invention are especially silicon dioxide, further aluminum oxide, titanium dioxide and ferric oxide, for example. Other examples are calcium and barium sulfates, calcium, barium and magnesium carbonates, calcium silicates, aluminum silicates and complex silicates and, generally, insoluble inorganic substances having a mean particle size below $0.1\mu$. The chemical composition of the substance is apparently of no importance per se and the effect is only dependent on the fineness of the added substance.

From a physical point of view the active fillers according to the invention are characterized by their extremely low mean particle size, which lies within the ranges 0.002 to $0.1\mu$, preferably within the ranges 0.005 to $0.05\mu$, that is to say, the particles of the active fillers are of the same order of magnitude as the colloidally dissolved asphaltenes which represent one of the chief constituents of the asphalts. In certain cases the filler particles may be associated to chain-formed aggregates which usually have a length of 2–15 times the mean diameter of the particles without this having an adverse effect on the activity of the filler. If on the other hand, the finely divided particles are associated in compact aggregates with a size exceeding $0.1\mu$, these aggregates will scarcely have any active properties.

The mixing of the asphalt or bituminous material and the filler may either be carried out in the heat, above the melting temperature of the asphalt, or, after diluting the latter with a suitable solvent capable of dissolving the asphalt, this solvent being driven off after the mixing operation. Suitable solvents for this purpose are, for example, petroleum fractions such as white spirit or kerosene, and further benzene. The incorporation of the filler into the asphalt to a homogeneous mixture is carried out by effectively stirring and working the mass with the help of mechanical means, for example in kneading machines or mixing equipment of other type.

The quantity of the filler may be varied within wide limits, such as 1–10, or 1–15 or 1–25% by volume, based on the volume of the asphalt or bituminous material, according to the composition of the initial material and the properties desired in the finished product. Good results may also be obtained, however, with lower contents of the added filler, such as only 0.5%. In place of a single substance, a mixture of two or more substances may be added.

As examples of suitable compositions may be mentioned mixtures of steam distilled asphalt or oxidized asphalt—for example asphalt obtained from crude oil of naphthene base type—and a filler consisting of silicon dioxide having a mean particle size within the ranges 0.005 to $0.05\mu$, in the proportions 1–10 or 1–15 volumes of the filler to 100 volumes of the asphalt.

Asphalt to which the favourable properties mentioned above have been imparted by the addition of an extremely finely divided filler according to the invention may also be mixed with fillers having a coarser grain size without appreciably reducing the effect of the finely divided fillers. If it is also desirable, with respect to the purpose of utilization of the asphalt, to add a coarse filler of this kind, for example ground lime-stone or ground silica, it is possible to proceed in such a way in the practical application of the invention, that the asphalt is mixed with a filler containing such coarse particles provided that the filler contains a fraction of particles in the stated quantities having a mean particle size within the ranges $0.002$–$0.1\mu$ in accordance with the invention.

The invention may be applied with advantage to asphalts of different origin and composition and also to similar bituminous products, such as distillation residues obtained in the distillation of naphthene base lubricating oils and synthetic light-coloured products having the consistency of asphalt. Examples of such bituminous products are the asphalts sold under the trade names "Cados" and "Lobytos."

The invention will now be more particularly described with reference to the following examples.

EXAMPLES 1–22

Steam distilled asphalt obtained from naphthene base crude oil was heated to 150° C. and mixed at this temperature with the fillers stated in Table I below in the proportions: 1 volume of the filler to 10 volumes of the asphalt while stirring effectively. The breaking point of the mixtures thus obtained was determined according to Fraas (IP 80/52; IP=Institute of Petroleum) and the fusing point by means of the "ball and ring method," (B and R method; IP 58/52) while the elasticity and resistance to wear were assessed by a comparison of the samples.

In this comparison the term "low" designates the elasticity of steam distilled asphalt obtained from naphthene base crude oil (fusing-point, R and B method=50° C.) and the term "high" is used to designate the elasticity of oxidized asphalt (fusing-point, R and B method=85° C.), while the term "medium" means an elasticity between these two qualities. Concerning the resistance to wear, the term "medium" designates the resistance to wear of steam distilled asphalt (fusing-point, R and B method =50° C.), while "good" refers to a wear which is about 50% lower.

The results of the investigation have been compiled in Table I.

From the Table I is further to be seen that the breaking point is not appreciably influenced by the addition of the filler independent of the particle size of the filler. This means that the temperature interval between the breaking point and the fusing point is strongly increased, as already indicated above. In certain cases it is, in reality, doubled.

Further the table shows that the elasticity of the asphalt as well as its resistance to wear is appreciably improved by the addition of the filler according to the invention.

The fillers according to the Examples 1 to 22 represent a number of different chemical compositions and, consequently, also substances with very different surface properties. In spite thereof, there is a striking accordance with respect to the breaking point, the fusing point and the elasticity and resistance to wear of samples having the same particle size, as will be seen from the table. For the sake of convenient supervision the results are also illustrated in the diagram in Figure 1 of the accompanying drawing which shows the increase in hardness of the asphalt in dependence on the particle size of the filler.

EXAMPLE 23

Steam distilled asphalt obtained from naphthene base crude oil (fusing point R and B=50° C.; breaking-point —10° C.) was heated to about 180° C. and mixed when hot in a mixer while effectively stirring with different quantities of fillers consisting of precipitated calcium carbonate having a mean particle size of $0.3\mu$ and extremely finely divided silicon dioxide having a mean particle size of $0.011\mu$, respectively.

*Table 1*

| Sample | | Filler mean particle size, $\mu$ | Breaking-point, °C. | Fusing-point, °C., R and B method | Elasticity | Resistance to wear |
|---|---|---|---|---|---|---|
| | Unmixed asphalt | | —10 | 50 | Low | Medium. |
| 1 | Asphalt + finely divided limestone | 0.7 | —10 | 52 | do | Do. |
| 2 | Asphalt + clay | 0.5 | —11 | 52 | do | Do. |
| 3 | do | 0.3 | —11 | 52 | do | Do. |
| 4 | Asphalt + silicon dioxide | 1.1 | —10 | 52 | do | Do. |
| 5 | do | 0.45 | —10 | 51 | do | Do. |
| 6 | do | 0.170 | —11 | 53 | do | Do. |
| 7 | do | 0.099 | —10 | 62 | do | Do. |
| 8 | do | 0.021 | —10 | 94 | Medium | Good. |
| 9 | do | 0.016 | —9 | 111 | do | Do. |
| 10 | do | 0.011 | —10 | 116 | do | Do. |
| 11 | Asphalt + aluminum oxide | 0.40 | —10 | 51 | Low | Medium. |
| 12 | do | 0.19 | —11 | 53 | do | Do. |
| 13 | do | 0.14 | —10 | 54 | do | Do. |
| 14 | do | 0.017 | —9 | 107 | Medium | Good. |
| 15 | do | 0.015 | —9 | 102 | do | Do. |
| 16 | Asphalt + titanium dioxide | 0.22 | —10 | 53 | Low | Medium. |
| 17 | do | 0.15 | —11 | 55 | do | Do. |
| 18 | do | 0.072 | —10 | 66 | do | Do. |
| 19 | do | 0.013 | —10 | 109 | Medium | Good. |
| 20 | Asphalt + ferric oxide | 0.33 | —11 | 52 | Low | Medium. |
| 21 | do | 0.17 | —10 | 52 | do | Do. |
| 22 | do | 0.021 | —9 | 90 | Medium | Good. |

The table shows that the fusing point is not influenced at all or only insignificantly, when the particle size of the filler decreases down to about $0.15\mu$. However, when the particle size decreases further, the fusing point is raised strongly, and for the lowest particle size the fusing point is as high at 116° C. In case of adding fillers of the kind hitherto used such a low content as 10 volumes filler to 100 volumes asphalt would only raise the fusing point by 1–2° C. while a corresponding addition of the filler according to the invention will produce an increase in the fusing point as high as 50–60° C.

In the same manner mixtures of oxidized asphalt obtained from naphthene base crude oil (fusing-point 86° C.; breaking point —19° C.) and the said fillers were prepared.

The breaking point and the fusing point of the mixtures thus obtained were determined and the results are given in Table II and are also illustrated diagrammatically in Fig. 2 on the drawing.

As will be seen, the difference in the results obtained by the active silicon dioxide and the inactive calcium carbonate is very remarkable.

Table II

| Asphalt | Filler Composition | Filler Volumes on 100 volumes asphalt | Breaking point, °C. | Fusing point, °C. |
|---|---|---|---|---|
| Oxidized asphalt. Fusing point (R and B), 86° C. | Silicon dioxide—Mean particle size, 0.011μ. | 1<br>3<br>4<br>5<br>10 | −19<br>−16<br>−15<br>−12<br>−10<br>−9 | 86<br>90<br>98<br>112<br>114<br>>200 |
| | Precipitated calcium carbonate—Mean particle size, 0.3μ. | 5<br>10<br>15<br>20<br>25 | −17<br>−14<br>−11<br>−9<br>−6 | 87<br>88<br>90<br>92<br>95 |
| Steam distilled asphalt. Fusing point (R and B), 50° C. | Silicon dioxide—Mean particle size, 0.011μ. | 1<br>2<br>3<br>5<br>10 | −10<br>−11<br>−11<br>−10<br>−9<br>−9 | 50<br>51<br>52<br>53<br>65<br>114 |
| | Precipitated calcium carbonate—Mean particle size, 0.3μ. | 5<br>10<br>15<br>20<br>25 | −10<br>−11<br>−10<br>−9<br>−7 | 51<br>52<br>52<br>51<br>52 |

EXAMPLE 24

10. kgs. steam distilled asphalt obtained from naphthene base crude oil and having a fusing point of 47° C. and a breaking point of −14° C. were dissolved in 40 litres of white spirit while heating to 50° C. To the mixture were added 3.6 kgs. extremely finely divided aluminum oxide (corresponding to 10 volumes aluminum oxide to 100 volumes of asphalt) while stirring effectively. The particle size of the aluminum oxide was 0.015μ. By steam distillation carried out as customary in the preparation of asphalt the added amount of white spirit was driven off.

The breaking point of the product thus obtained was −8° C. and the fusing point 120° C.

What we claim is:

1. A novel asphaltic composition having improved hardness, strength, and elasticity which comprises between about 75 and 99% by volume of an asphaltic material in admixture with between about 1–25% by volume of a finely divided solid filler, said filler having a mean particle size of within the range of about 0.005 to 0.05 micron and being selected from the group consisting of silicon dioxide, aluminum oxide, titanium dioxide and ferric oxide.

2. The composition of claim 1 wherein the filler is silicon dioxide.

3. The composition of claim 1 wherein the filler is aluminum oxide.

4. The composition of claim 1 wherein the said asphaltic material is steam distilled asphalt.

5. The composition of claim 1 wherein the said asphaltic material is oxidized asphalt.

6. A novel method for increasing the hardness, strength and elasticity of asphalt products which comprises admixing between about 75 and 99% by volume of an asphaltic material with between 1 and 25% by volume of a finely divided solid filler, said filler having a mean particle size within the range of about 0.005 to 0.05 micron and being selected from the group consisting of silicon dioxide, aluminum oxide, titanium dioxide and ferric oxide.

References Cited in the file of this patent

UNITED STATES PATENTS

| | | |
|---|---|---|
| 369,301 | Swan | Aug. 30, 1887 |
| 2,333,948 | Muskat | Nov. 9, 1943 |
| 2,399,717 | Arveson | May 7, 1946 |
| 2,400,563 | Mark | May 31, 1946 |
| 2,459,520 | Greenshields | Jan. 18, 1949 |
| 2,577,485 | Rule | Dec. 4, 1951 |
| 2,584,919 | Pullar | Feb. 5, 1952 |
| 2,661,301 | Capell | Dec. 1, 1953 |

FOREIGN PATENTS

| | | |
|---|---|---|
| 216,911 | Great Britain | June 5, 1924 |
| 280,085 | Great Britain | Nov. 10, 1927 |
| 176,055 | Switzerland | Mar. 31, 1935 |

OTHER REFERENCES

Abraham: "Asphalts and Allied Substances," fifth edition, vol. I (1945) (page 543 relied upon).

Hackh's Chemical Dictionary, 2nd edition, page 237 (1937).

Lord: Journal Agricultural Research, 17 (1919), pages 167–176.

Alexander: Colloid Chemistry, vol. III (1931), page 499.

Abraham: Asphalts and Allied Substances, fifth edition, vol. I (1945) pages 550 and 551.

Alexander: Colloid Chemistry, vol. III (1931), pages 500 and 501.

Alexander: Colloid Chemistry, vol. I (1926), page 855.